US011630714B2

(12) United States Patent
Kagan et al.

(10) Patent No.: US 11,630,714 B2
(45) Date of Patent: Apr. 18, 2023

(54) AUTOMATED CRASH RECOVERY

(71) Applicant: Disney Enterprises, Inc., Burbank, CA (US)

(72) Inventors: Gary Kagan, New York, NY (US); Nathan Lefler, New York, NY (US); Josh Phelps, New York, NY (US); James A. Corrigan-Colville, Northport, NY (US); Benjamin Manning, New York, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/712,937

(22) Filed: Apr. 4, 2022

(65) Prior Publication Data
US 2022/0229718 A1 Jul. 21, 2022

Related U.S. Application Data

(63) Continuation of application No. 16/696,734, filed on Nov. 26, 2019, now Pat. No. 11,307,920.

(51) Int. Cl.
*G06F 11/00* (2006.01)
*G06F 11/07* (2006.01)
*G06F 11/36* (2006.01)

(52) U.S. Cl.
CPC ........ *G06F 11/0778* (2013.01); *G06F 11/079* (2013.01); *G06F 11/0715* (2013.01); *G06F 11/0748* (2013.01); *G06F 11/366* (2013.01); *G06F 11/3636* (2013.01)

(58) Field of Classification Search
CPC ............. G06F 11/3466; G06F 11/3409; G06F 11/3636; G06F 11/0793; G06F 11/079; G06F 11/3003; G06F 11/0778
See application file for complete search history.

(56) References Cited

U.S. PATENT DOCUMENTS

| | | | |
|---|---|---|---|
| 8,473,251 B1 * | 6/2013 | Noth .................... | G06F 11/079 702/183 |
| 9,438,491 B1 * | 9/2016 | Kwok ................ | G06F 11/3466 |
| 10,013,334 B1 * | 7/2018 | Carey ................ | G06F 11/3636 |
| 2014/0282425 A1 * | 9/2014 | Zhao .................. | G06F 11/3414 717/127 |
| 2016/0197955 A1 * | 7/2016 | Davidov ............ | G06F 11/0778 726/23 |

\* cited by examiner

*Primary Examiner* — Charles Ehne
(74) *Attorney, Agent, or Firm* — Patterson + Sheridan, LLP

(57) ABSTRACT

Methods for improving operation of a user device executing an application. The methods include collecting a first set of data corresponding to a run time environment of the application, collecting a second set of data corresponding to a crash of the application, identifying a cause of the crash based on the first set of data and a second set of data and determining the cause of the crash is associated with an application feature corresponding to a feature flag.

20 Claims, 5 Drawing Sheets

AUTOMATED CRASH RECOVERY

CROSS-REFERENCE TO RELATED APPLICATIONS

This application is a continuation of co-pending U.S. patent application Ser. No. 16/696,734, filed Nov. 26, 2019. The aforementioned related patent application is herein incorporated by reference in its entirety.

BACKGROUND

An application running on a user device may crash for any of a plurality of different reasons. Under conventional circumstances, the cause of the crash may not be fixed until an update is provided to the user device. However, the process of notifying a developer that the crash has occurred, determining the cause of the crash, generating the update and providing the update to the user device takes time. The longer this process takes, the longer the user is without a properly functioning application.

Various negative consequences may arise while the cause of the crash remains unresolved. For example, the application's ability to generate revenue may be limited, the application's reputation may be negatively impacted, the user may be unable to access services the user expects to be available, the user may turn to a competitor's application, etc. Thus, both the entity that distributes the application and the user want the application to resume operating without crashing as quickly as possible. Accordingly, there is a need for a mechanism that is able to quickly mitigate the cause of the crash.

DETAILED DESCRIPTION

Figure 1:
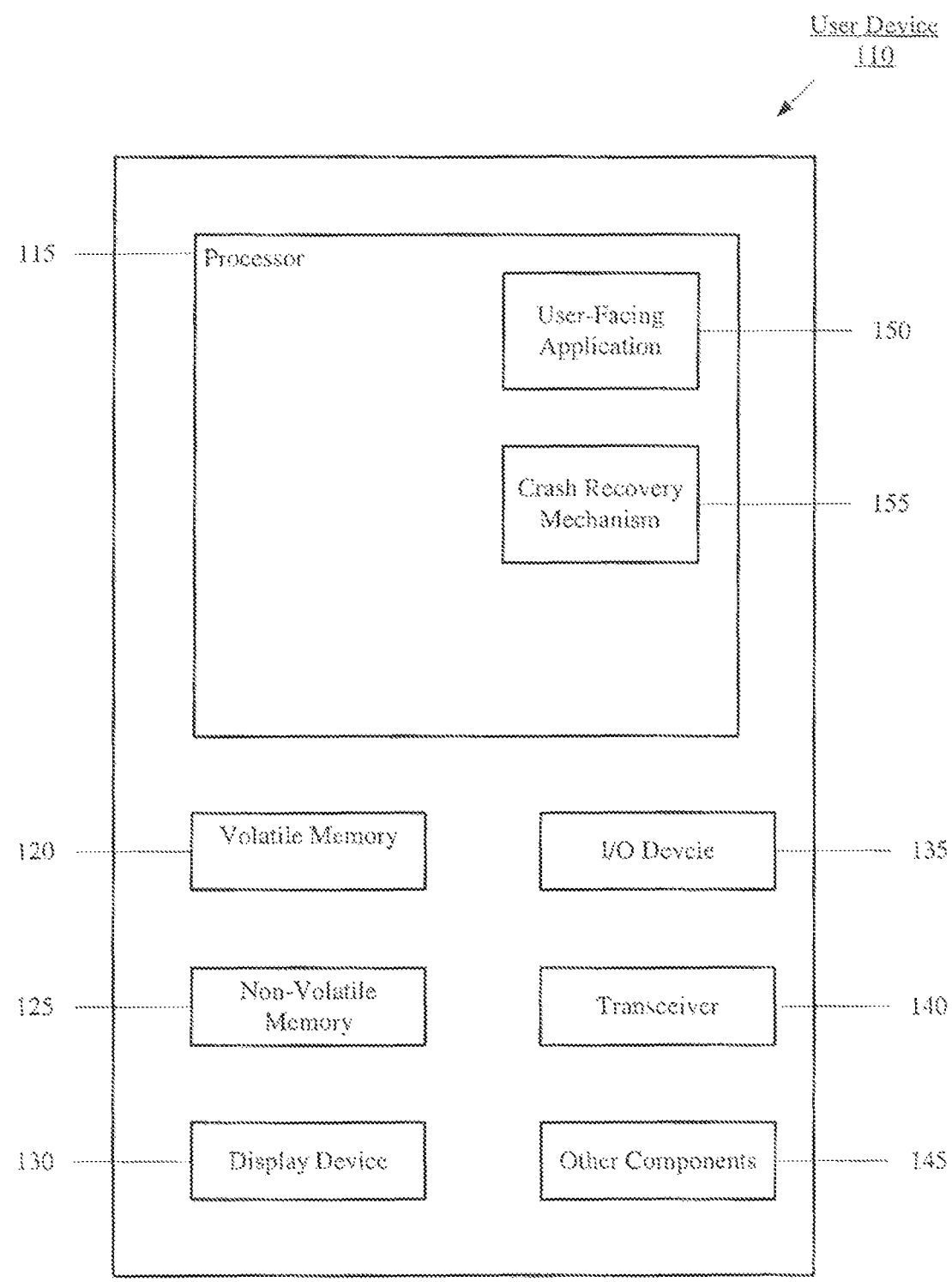
FIG. 1 shows an exemplary user device according to various exemplary embodiments.

The exemplary embodiments may be further understood with reference to the following description and the related appended drawings, wherein like elements are provided with the same reference numerals. The exemplary embodiments are related to a device, a system, and a method for automated crash recovery at a user device. As will be described below, the exemplary embodiments relate to improving the operation of a user device running an application by mitigating causes of application crashes locally, at the user device.

The exemplary embodiments are described with regard to a user-facing application running on a user device. A user-facing application generally refers to an application that is configured for user interaction. However, any reference to the application being a particular type of application or the user device being a particular type of device is only provided for illustrative purposes. The exemplary embodiments may apply to any type of software being executed by any type of electronic device equipped with the appropriate hardware.

The exemplary embodiments are also described with regard to the application experiencing a crash. Throughout this description, a crash generally refers to an instance during which the application does not operate as intended. To provide an example from the user perspective, when the crash occurs the application may appear to freeze or unexpectedly quit. Any reference to the term crash is provided for illustrative purposes. Different entities may refer to a similar concept by a different name. The exemplary embodiments may apply to any type of error that may occur during the execution of the application that causes the application to operate in an unintended manner.

To provide a general example of when and why an application may crash consider the following exemplary scenario. The user device is powered on, an operating system has been booted, the application's machine code is included in storage and the application is available for user selection. Subsequently, the application may be selected by the user via user input. This may trigger the application to launch which may include a mechanism loading the application's machine code into memory for execution.

From the user perspective, as the application loads the user may be presented with various graphics. During runtime, the user may be presented with one or more graphical user interfaces (GUIs) that may include or relate to any of a variety of different application features. Throughout this description, an application feature may refer to any aspect of the application that is a result of executing machine code. For example, the term application feature may refer to any of the following aspects: a graphic, an animation, a media player, a web browser, a display setting (e.g., dark mode, a GUI format, aspect ratio, font size, etc.), a component configured to respond to input, an advertisement, a web feed, a component configured to alter or enhance media (e.g., apply a filter, crop, convert file format, etc.) or a component configured to group data (e.g., create a photo album, create a playlist, etc.). These exemplary aspects of the application are only provided for illustrative purposes and are not intended to limit the term application feature to any particular aspect. Accordingly, throughout this description, the term application feature is used to represent any aspect of the application that is a result of executing machine code.

Each application feature may be represented by various programming constructs (e.g., methods, functions, procedures, system calls, conditional statement, etc.). During runtime, the executed machine code may include instructions that represent various programming constructs for the application feature. For example, an application feature such as a video player may be based on one or more functions. To provide the functionality of the video player to the user, the portion of the machine code corresponding to the one or more functions may be executed.

The application may crash due to the execution of a portion of the application's machine code at any instance after the application has been launched. For example, a crash may occur if the execution of the machine code causes the application to attempt to read or write to a portion of the memory that is not allocated to the application. Other causes of a crash may include scenarios such as, but not limited to, executing machine code that comprises privileged or invalid instructions, attempting to perform an invalid system call, attempting to access restricted or non-existent resources, executing invalid arguments, etc. Accordingly, the cause of a crash may be the execution of machine code that corresponds to a particular application feature.

The application may be configured to utilize a crash reporter. Conventionally, a crash reporter generally refers to a mechanism that is configured to gather information regarding the execution of the application prior to the crash and then provide the information to a remote location, e.g., a crash reporting service. Subsequently, the cause of the crash may be determined and then an update may be generated that is intended to fix the cause of the crash. The update may then be provided to the user device. The update may then be provided to the user device. Once the update is downloaded at the user device, the updated application may return to operating without crashing. However, this conventional crash reporting process necessarily takes time because the crash needs to be reported to the crash reporting service and the developer and then the update needs to be created, tested and downloaded. Accordingly, conventional crash reporting inadequately addresses the user and developer's desire to resume operating the application as quickly as possible in a manner that avoids crashes.

The exemplary embodiments relate to mitigating the cause of the crash locally at the user device. For instance, a mechanism may be implemented that determines which portion of the application's machine code caused a crash to occur. The mechanism may then disable the application feature that corresponds to the identified portion of the application's machine code. As a result, the portion of the application's machine code that was triggering the crash is no longer executed and thus, the application may operate without crashing.

The exemplary embodiments are described with regard to mitigating the cause of the crash by disabling an application feature using a feature flag. Throughout this description a feature flag refers to a component of the application that enables or disables the execution of the machine code corresponding to an application feature. Accordingly, an application feature may correspond to a feature flag. If an application feature corresponds to a feature flag, the application has been configured to operate when the particular application feature is either enabled or disabled. Any reference to a feature flag is for illustrative purposes, different entities may refer to a similar concept by a different name.

In the context of source code, the feature flag may be a variable within a conditional statement. When the feature flag is set to a first value, a block of code may be executed and when the feature flag is set to a second value, the block of code may not be executed. The exemplary mechanism may be configured to modify the local copy of the configuration to set a feature flag (e.g., enable/disable the corresponding application feature).

To provide a general example, the mechanism may identify that the machine code corresponding to a particular animation is causing the application to crash. This animation is an application feature with a corresponding feature flag. Subsequently, the mechanism may change the value of the feature flag to disable the execution of the machine code corresponding to the animation. As a result, from the user perspective, the animation is no longer displayed, and the application operates without crashing. Thus, compared to applications that rely solely on conventional crash reporting, the exemplary embodiments provide a more fault tolerant application that is able to recover from a crash faster by mitigating the cause of the crash locally and without human intervention.

FIG. 1 shows an exemplary user device 110 according to various exemplary embodiments. Those skilled in the art will understand that the user device 110 may be any type of electronic component that is configured to execute software or firmware, e.g., a desktop computer, a mobile phone, a tablet computer, a smartphone, phablets, embedded devices, wearable device, Internet of Things (IoT) devices, etc. Accordingly, the user device 110 may represent any electronic device.

The user device 110 may include a processor 115, volatile memory 120, non-volatile memory 125, a display device 130, an input/output (I/O) device 135, a transceiver 140, and other components 145. The other components 145 may include, for example, an audio input device, an audio output device, a battery that provides a limited power supply, a data acquisition device, ports to electrically connect the user device 110 to other electronic devices, ports that provide a wired connection to an internet protocol (IP) based network, etc.

The processor 115 may be configured to execute a plurality of applications of the user device 110. For example, the applications may include a user-facing application 150. The user-facing application 150 may be configured to include any of a variety of different application features (e.g., a video player, a web feed, various GUIs, various graphics, various animations, etc.). In some embodiments, the user-facing application 150 may include a crash recovery mechanism 155. In other embodiments, the crash recovery mechanism 155 may be a separate piece of software. The crash recovery mechanism 155 may be configured to identify an application feature of the user-facing application 150 that caused the user-facing application 150 to crash and then mitigate the cause of the crash locally by disabling the identified application feature.

The user-facing application 150 and crash recovery mechanism 155 being executed by the processor 115 is only exemplary. The functionality associated with the user-facing application 150 and the crash recovery mechanism 155 may also be represented as separate incorporated components of the UE 110 or may be a modular component coupled to the UE 110, e.g., an integrated circuit with or without firmware. For example, the integrated circuit may include input circuitry to receive signals and processing circuitry to process the signals and other information. In addition, in some user devices, the functionality described for the processor 115 is split among two or more processors. The exemplary embodiments may be implemented in any of these or other configurations of a user device.

The volatile memory 120 may represent a hardware component that provides random access memory (RAM), which is a type of memory used for storage on a temporary basis. The volatile memory 120 may refer to any type of RAM, e.g., static RAM, dynamic RAM, synchronous RAM, enhanced RAM, etc. However, the volatile memory 120 being a type of RAM is only exemplary and the volatile memory 120 may refer to any type of volatile memory component that is used to store data or machine code for execution by the user device 110. The non-volatile memory 125 may represent a hardware component that stores data that may be accessed by the user device 110 (e.g., a hard drive). The non-volatile memory 125 may represent any appropriate storage component, e.g., a hybrid hard drive (HDD), a solid-state drive (SSD), an external storage device, etc.

The display device 130 may be a hardware component configured to display data or other information to a user while the I/O device 135 may be a hardware component that enables the user to enter inputs. The display device 130 and the I/O device 135 may be separate components or integrated together such as a touchscreen. The transceiver 140 may be a hardware component configured to establish a connection with a wireless network, e.g., a cellular network, a wireless local area network (WLAN), etc.

Figure 2:
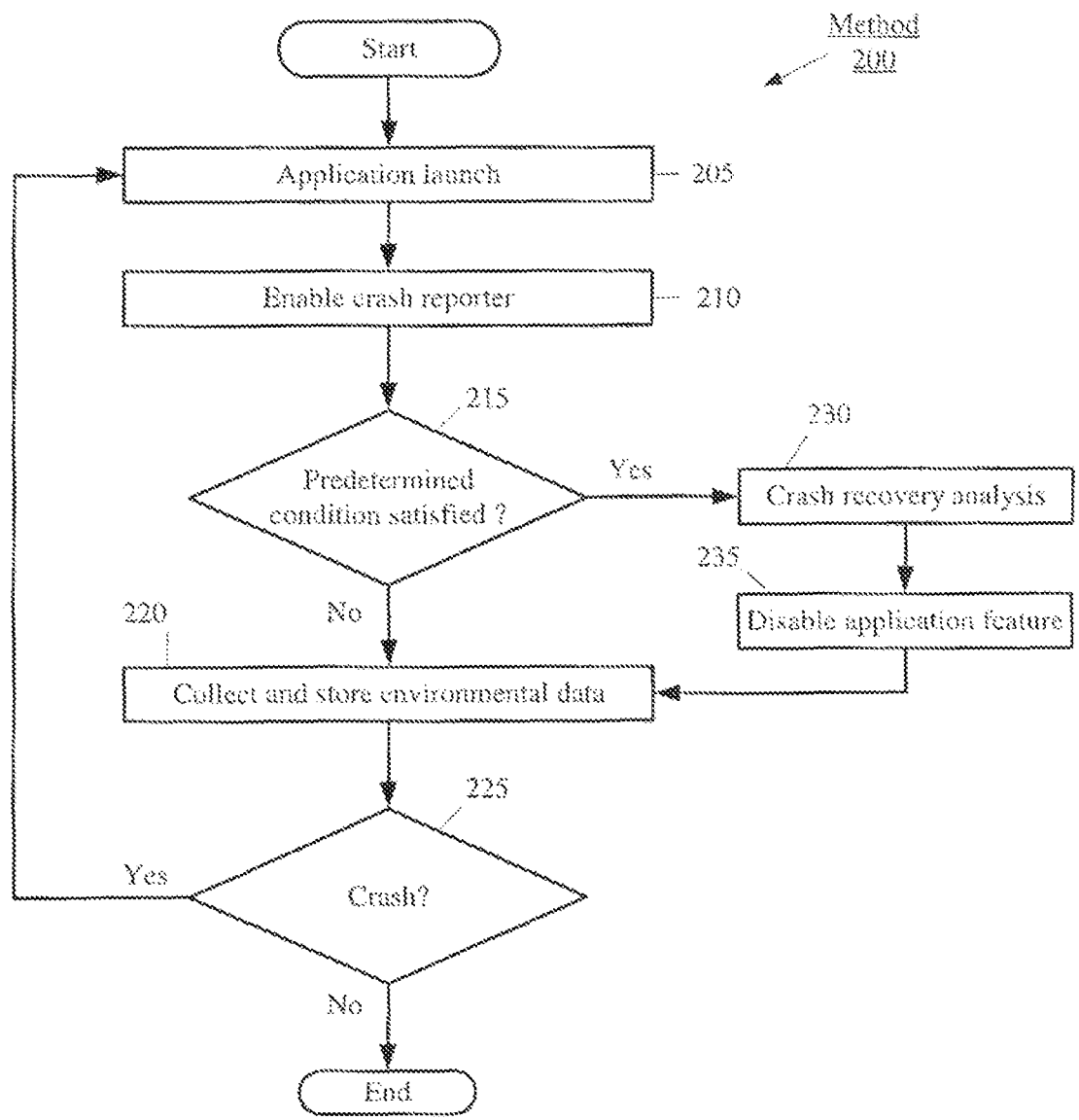
FIG. 2 shows an exemplary method for the user-facing application configured to implement automated crash recovery according to various exemplary embodiments.

FIG. 2 shows an exemplary method 200 for the user-facing application 150 to implement automated crash recovery according to various exemplary embodiments. The method 200 will be described with regard to the user device 100 of FIG. 1.

In 205, the user-facing application 150 is launched. For example, a user-initiated action at the user-device 110 may initiate the launch (e.g., the selection of an icon). In response, the application's machine code may be loaded from the non-volatile memory 125 to the volatile memory 120 for execution. This may also include loading machine code for any linked dependencies associated with the user-facing application 150. For example, the user-facing application 150 may be configured with a dynamically linked dependent library. Like the application features, when machine code corresponding to a linked dependency is executed it may result in an error that causes the user-facing application 150 to crash.

In 210, a crash reporter is enabled. For example, after or during initial startup operations are performed, the user-facing application 150 may enable the crash reporter. The crash reporter may be embedded in the user-facing application 150 or may be a software tool configured to operate in conjunction with the user-facing application 150. Enabling the crash reporter may include the crash reporter hooking into the exception handlers of the user-facing application 150 and monitoring for indications that a crash has occurred.

If a crash occurs, the crash reporter may be configured to save information regarding the execution of the user-facing application 150 to the non-volatile memory 125. This information may be referred to as a crash report. The crash report that is saved to the non-volatile memory may include information that is conventionally included in a crash report. However, the crash report according to the exemplary embodiments may also include one or more stack traces. The stack trace may include a variety of different types of information, including but not limited to, an indication of which thread of execution crashed, an indication of the call stack that lead up to the crash, an indication of the file the call originated from, an indication of the offset within the machine code, an indication of the exception type and an indication of memory locations. As will be described in more detail below, the crash recovery mechanism 155 may utilize the crash report in determining which portion of the machine code caused the user-facing application 150 to crash.

In 215, the user-facing application 150 determines whether a predetermined condition is satisfied. The predetermined condition may indicate to the user-facing application 150 whether a crash occurred during a previous execution of the user-facing application 150. The user-facing application 150 may make this determination based on any of a plurality of factors, including but not limited to, information collected by the crash reporter, information collected by the crash recovery mechanism 155, information collected by the user-facing application 150 or information collected from other software, hardware or firmware of the user device 110.

When the predetermined condition in 215 is satisfied, this may indicate to the crash recovery mechanism 155 that a crash occurred during the previous execution of the user-facing application 150. Accordingly, as will be described in more detail below in 230, the crash recovery mechanism 155 may attempt to identify the cause of the crash by performing crash recovery analysis.

In this example, the predetermined condition in 215 is not satisfied. Accordingly, the method 200 continues to 220. In 220, the crash recovery mechanism 155 collects and stores information corresponding to the runtime environment. Throughout this description this information may be referred to as environmental data. To provide an example, the environmental data may include information such as, but not limited to, a method or functions location within the machine code of the user-facing application 150 and the user's interactions with the user-facing application 150. The collection of environmental data will be described in more detail below with regard to method 300 of FIG. 3.

As will be described below, if a crash occurs, the crash recovery mechanism 155 may utilize the environmental data in determining which portion of the machine code caused the user-facing application 150 to crash.

In 225, a crash may occur during runtime of the user-facing application 150. If no crash occurs in 225, the method 200 ends. If a crash does occur in 225, the method 200 returns to 205 where the user-facing application 150 is relaunched.

As indicated above, after the launch in 205, the crash reporter is enabled in 210 and then the method 200 returns to 215 where the user-facing application 150 determines whether a predetermined condition is satisfied. In this example, since the crash occurred in 225, the predetermined condition in 215 is satisfied and the method 200 continues to 230.

In 230, the crash recovery mechanism 155 performs crash recovery analysis in an attempt to determine the cause of the crash in 225. The crash recovery analysis may include processing the crash report and the environmental data. For example, a stack trace included in the crash report may coincide with a method or functions location within the machine code of the user-facing application 150 as indicated in the environmental data. This may indicate to the user-facing application 150 that machine code corresponding to a particular application feature caused the crash in 225. The crash recovery analysis will be described in more detail below with regard to method 400 of FIG. 4.

In 235, the crash recovery mechanism 155 disables the application feature corresponding to the identified machine code. For example, the crash recovery mechanism 155 may modify the local copy of the configuration to set a feature flag to a value that causes the execution of the machine code corresponding to the application feature to not be executed. Subsequently, the method 200 returns to 220 where the environmental data for the current execution of the user-facing application 150 is collected.

Figure 3:
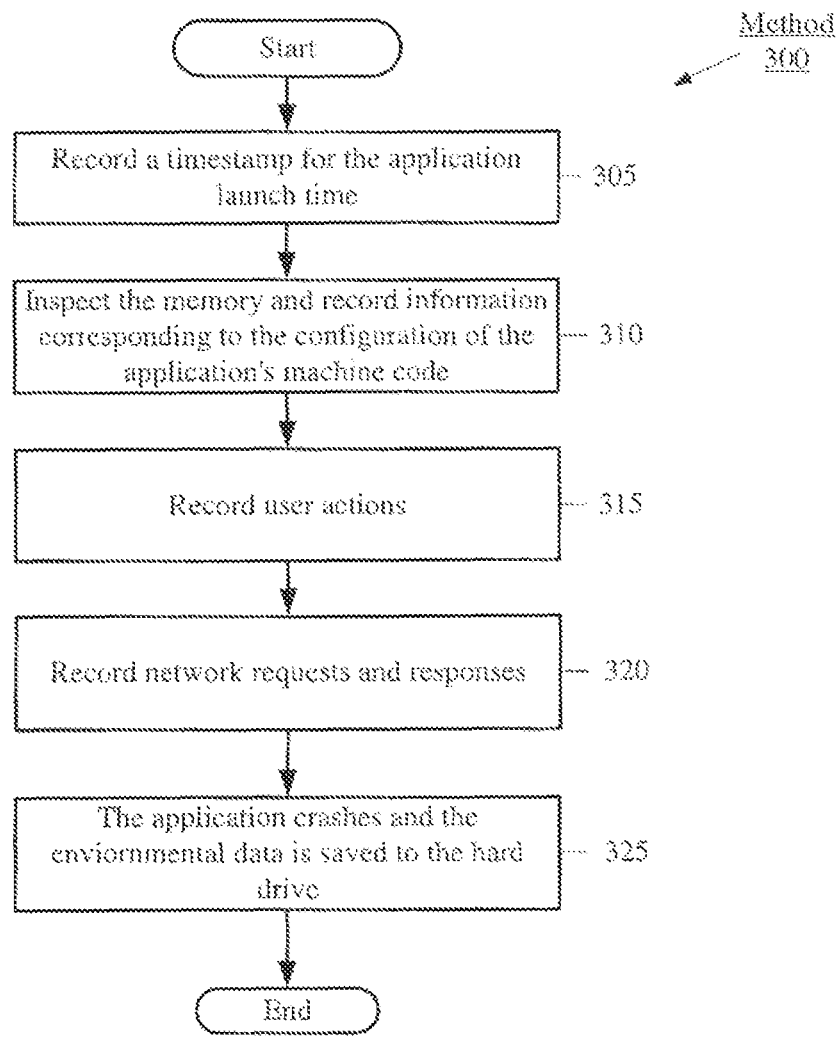
FIG. 3 shows an exemplary method for recording environmental data according to various exemplary embodiments.

FIG. 3 shows an exemplary method 300 for recording environmental data according to various exemplary embodiments. The method 300 will be described with regard to the user device 100 of FIG. 1 and the method 200 of FIG. 2. Any particular type of information referenced in the description of the method 300 is not intended to limit the exemplary embodiments to recording or utilizing any particular type of information nor is it intended to limit the scope of the term environmental data to include any particular type of information. Environmental data may include any point of data from the runtime environment that may provide an indication of the cause of a crash.

As mentioned above, the environmental data may be utilized during crash recovery analysis to determine the cause of a crash. The crash recovery analysis will be described in more detail below with regard to the method 400 of FIG. 4.

In 305, the crash recovery mechanism 155 records a timestamp for the application launch time. Generally, the cause of a crash is more difficult to mitigate when the crash occurs soon after application launch. Accordingly, as will be described below in FIG. 4, the application launch time may be utilized to determine how to mitigate the cause of the crash.

In 310, the crash recovery mechanism 155 inspects the volatile memory 120 and records information corresponding to the configuration of the application's machine code. This may include marking the location of a method or function within the machine code that corresponds to an application feature configured with a feature flag. As will be described below, this information and the crash report may be utilized to determine the cause of the crash.

Marking a location of a portion of the machine code may be based on the offset. In this context, offset generally refers to an indication of the distance between a first location within the machine code and a second location within the machine code. The offset is recorded because it remains constant between application launches and offsets corresponding to various portions of the machine code may be included in the crash report.

For instance, as indicated above, the user-facing application 150 may include an application feature that corresponds to a feature flag. In this example, from the machine code perspective, the application feature corresponding to the feature flag may be comprised of instructions that represent a first method and a second method. During runtime, the crash recovery mechanism 155 may inspect the contents of the memory for the machine code representation of the first method and the second method. When the first method is identified within the machine code, the crash recovery mechanism 155 may record the offset of the first method and store an indication that the offset of the first method is associated with the corresponding feature flag. Similarly, when the second method is identified within the machine code, the crash recovery mechanism 155 may record the offset of the second method and store an indication that the offset of the second method is associated with the corresponding feature flag. Thus, the environmental data may include information that indicates the offset of the first method and the offset of the second method correspond to the same feature flag.

As will be described below with regard to FIG. 4, the stack trace of the crash report may include indications of offsets corresponding to various portions of the machine code that were executed prior to the crash. Accordingly, if either the offset of the first method or the offset of the second method is identified in the stack trace of the crash report, the crash recovery mechanism 155 may determine that the application feature comprised of the first method and the second method was the cause of the crash. Thus, crash recovery mechanism 155 may mitigate the crash by setting the feature flag to a value that prevents the machine code corresponding to the application feature from executed.

In some embodiments, the machine code may be built and delivered by the developer in a format that is compatible with the user device 110. In this scenario, offsets within the machine code may be determined at compile time. In other embodiments, the user-facing application 150 may be delivered by the developer in an intermediary representation that is to be compiled down into a format that is compatible with the user device 110. In this scenario, offsets within the machine code may be determined during runtime.

In 315, the crash recovery mechanism 155 records user actions. If a crash occurs, the actions performed by the user may indicate which application features were being utilized prior to the crash.

In 320, the crash recovery mechanism 155 records network requests and responses. For example, the user device 110 may be connected to a wireless network and the user-facing application 150 may be connected to a server via the network connection. The user-facing application 150 may be configured to access various services from the server. For example, during runtime, the server may provide streaming media (e.g., audio, video) to be played by a media player (e.g., an application feature) embedded within the user-facing application 150. Accordingly, the user-facing application 150 may be configured to send requests via the network connection and receive responses from the network connection. Operations related to processing the data associated with these requests and responses may cause a crash to occur.

In 325, the user-facing application 150 crashes and the environmental data is saved to the non-volatile memory 125 for subsequent analysis.

Figure 4:
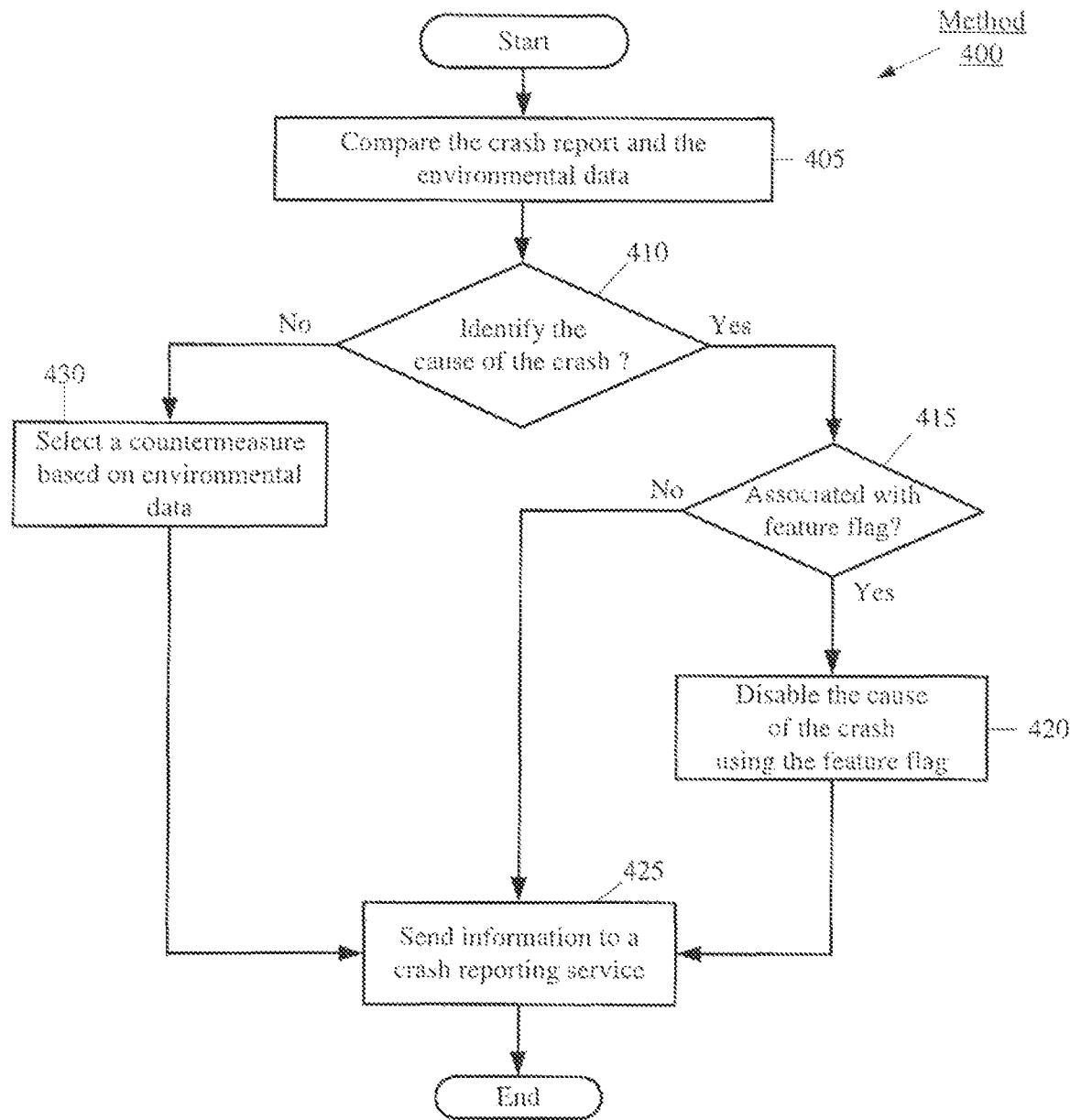
FIG. 4 shows an exemplary method for crash recovery analysis according to various exemplary embodiments.

FIG. 4 shows an exemplary method 400 for crash recovery analysis according to various exemplary embodiments. The method 400 will be described with regard to the user device 100 of FIG. 1, the method 200 of FIG. 2 and the method 300 of FIG. 3. As referenced in the description of the method 200, the crash recovery analysis may be performed by the crash recovery mechanism 155 after the user-facing application 150 crashes during a previous execution.

In 405, the crash recovery mechanism 155 compares the crash report and the environmental data. As indicated above, the crash report may include a stack trace that indicates which thread of execution crashed, the call stack that lead up to the crash, the file the call originated from, the offset within the machine code of the call, the exception type and memory locations.

Figure 5:
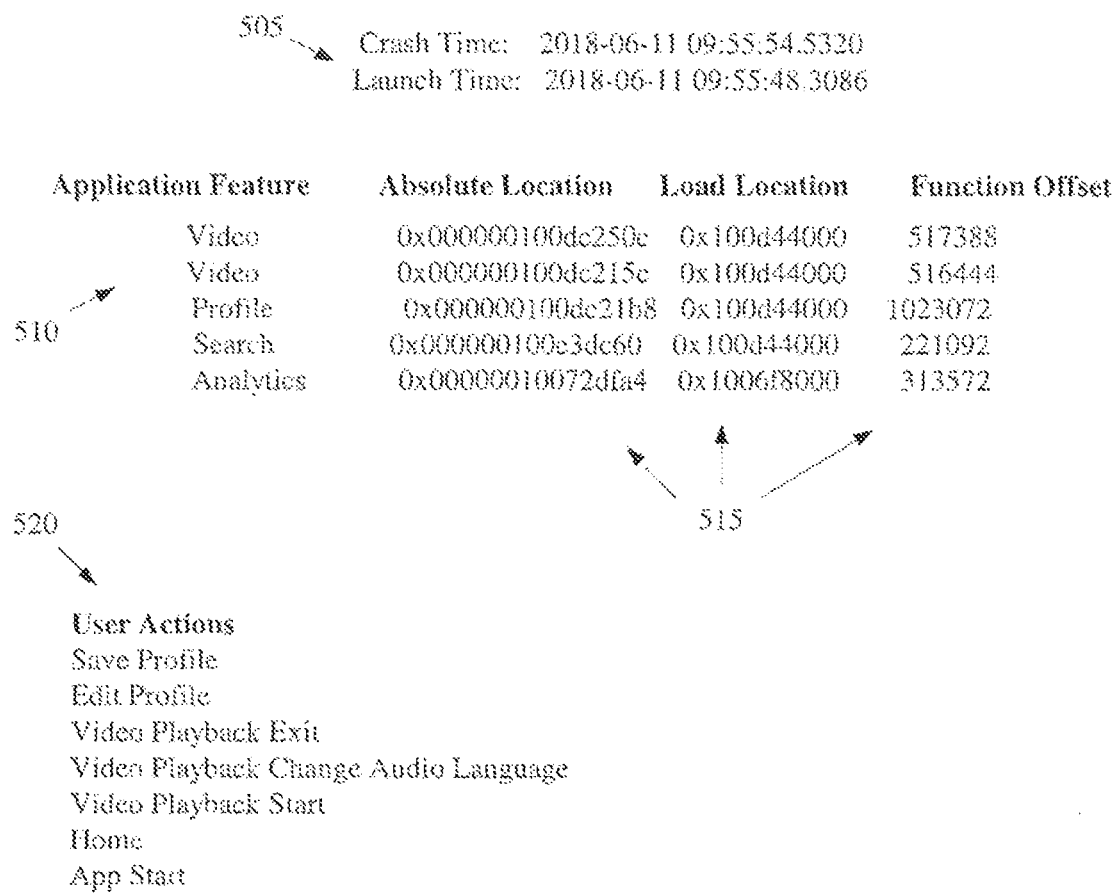
FIG. 5 shows an example of environmental data according to various exemplary embodiments.

The environmental data may include information corresponding to the configuration of the user facing-application's 150 machine code within the volatile memory 120. FIG. 5 shows an example of environmental data according to various exemplary embodiments. The environmental data may include a first portion 505 that includes a timestamp that indicates when the user-facing application 150 launched and a timestamp that indicates when the user-facing application 150 crashed. The environmental data may include a second portion 510 that includes an indication of the application features that are configured with a corresponding feature flag. A third portion 515 includes various memory locations for the application features included in the second portion 510. The environmental data may include a further portion 520 that includes an indication of the user actions that occurred during runtime.

The exemplary environmental data show in FIG. 5 is only provided for illustrative purposes and is not intended to limit environmental data to the data show in FIG. 5 nor is it intended to indicate that environmental data is stored in the format shown in FIG. 5. The Environmental data may include any point of data from the runtime environment that may provide an indication of the cause of a crash and may be stored in any appropriate format.

Returning to 405, a comparison of the offsets and other location data from the crash report to the offsets and other location data from the environmental data may indicate which application feature or linked dependency was the cause of the crash.

In 410, the crash recovery mechanism 155 determines whether the comparison in 405 identifies the cause of the crash. If an application feature or linked dependency is identified, the method 400 continues to 415. If the crash recovery mechanism 155 is unable to identify a particular application feature or linked dependency as the cause of the crash, the method 400 continues to 430.

In 415, the crash recovery mechanism 155 determines whether the identified cause of the crash is associated with a feature flag. If the identified cause of the crash is associated with a feature flag, the method 400 continues to 420.

In 420, the software feature determined to have caused the crash is disabled using the feature flag. For example, the cause of the crash may be identified as particular application feature. The crash recovery mechanism 155 may modify the local copy of the configuration to change the value of the feature flag corresponding to the identified application feature to a value that prevents the machine code corresponding to the identified application feature from being executed. Thus, the cause of the crash during the previous execution of the user-facing application 150 has been disabled.

In 425, the user-facing application 150 may send information to a crash reporting service. However, unlike conventional crash reporting, the user-facing application 150 may send information that includes an indication of the cause of the crash. This may allow developers to provide an update to other user devices prior to the user devices experiencing a similar crash. Returning to 415, if the identified cause of the crash is not associated with a feature flag, the method 400 continues to 425. After the information is sent to the crash reporting service in 425 the method 400 may end.

Returning to 430, since no clear indication is identified in 410, the crash recovery mechanism 155 may select a countermeasure based on the environmental data.

A first countermeasure may include disabling various portions of the user-facing application's 150 machine code using a plurality of feature flags. For example, while the comparison in 405 did not provide a clear indication as to the cause of the crash, the comparison in 405 may indicate that a plurality of application features or linked dependencies were potentially the cause of the crash. Other environmental data such as the user actions recorded in 315 and the network requests and responses recorded in 320 may also provide an indication of one or more application features or linked dependencies that were potentially the cause of the crash. Using this type of data, the crash recovery mechanism 155 may identify a plurality of feature flags.

Accordingly, in some embodiments, the crash recovery mechanism 155 may disable all of the identified feature flags. In other embodiments, the crash recovery mechanism 155 may initially disable a subset of the identified feature flags and if a crash occurs, disable a further subset of the corresponding feature flags during the subsequent execution of the user-facing application 150.

A second countermeasure may include altering the behavior of the user-facing application 150. This may include preventing further machine code execution after a particular event. For example, as mentioned above with regard to 305 the cause of a crash is more difficult to mitigate when the crash occurs soon after application launch. Accordingly, if the difference between the application launch time and the application crash time does not satisfy a predetermined threshold, the crash recovery mechanism 155 may alter the behavior of the user-facing application 150 such that further machine code is not executed until configuration information is received from a developer that is intended to mitigate the cause of the crash.

After the counter measure is implemented, the method 400 continues to 425 where the user-facing application 150 may send information to a crash reporting service. If an appropriate counter measure is identified, the information sent to the crash reporting service may also identify the selected counter measure. Thus, unlike conventional crash reporting, in this scenario the information may identify the cause of the crash and a way to mitigate the cause of the crash.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a Linux based OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
    collecting a first set of data corresponding to a run time environment of an application executing on a user device;
    collecting a second set of data corresponding to a crash of the application;
    identifying an executable portion of the application, comprising at least one of:
        (i) identifying a cause of the crash based on the first set of data and the second set of data, and identifying the executable portion of the application based on the cause of the crash; or
        (ii) determining that the cause of the crash is indeterminate, and identifying the executable portion of the application based on the first set of data; and
    altering execution of the identified executable portion of the application.

2. The method of claim 1, wherein altering execution of the identified executable portion of the application comprises:
    disabling an application feature using a corresponding feature flag, based on determining the cause of the crash is associated with the application feature.

3. The method of claim 1, further comprising:
    determining the cause of the crash is associated with an application feature corresponding to a feature flag,
    wherein the application feature corresponds to the executable portion of the application, and
    wherein the first set of data includes a memory location of the executable portion of the application.

4. The method of claim 3, wherein the second set of data includes one or more stack traces corresponding to the crash.

5. The method of claim 4, wherein determining the cause of the crash is associated with the application feature is based on identifying the memory location of the executable portion of the application within the one or more stack traces.

6. The method of claim 1, further comprising:
sending, by the user device, information to a remote location via a network connection, wherein the information includes an indication that the cause of the crash is associated with an application feature.

7. The method of claim 6, wherein the information is a crash report.

8. A user device comprising:
a processor; and
a memory storing a program, which, when executed on the processor, performs operations, the operations comprising:
collecting a first set of data corresponding to a run time environment of an application executing on a user device;
collecting a second set of data corresponding to a crash of the application;
identifying an executable portion of the application, comprising at least one of:
(i) identifying a cause of the crash based on the first set of data and the second set of data, and identifying the executable portion of the application based on the cause of the crash; or
(ii) determining that the cause of the crash is indeterminate, and identifying the executable portion of the application based on the first set of data; and
altering execution of the identified executable portion of the application.

9. The user device of claim 8, wherein altering execution of the identified executable portion of the application comprises:
disabling an application feature using a corresponding feature flag, based on determining the cause of the crash is associated with the application feature.

10. The user device of claim 8, the operations further comprising:
determining the cause of the crash is associated with an application feature corresponding to a feature flag,
wherein the application feature corresponds to the executable portion of the application, and
wherein the first set of data includes a memory location of the executable portion of the application.

11. The user device of claim 10, wherein the second set of data includes one or more stack traces corresponding to the crash.

12. The user device of claim 11, wherein determining the cause of the crash is associated with the application feature is based on identifying the memory location of the executable portion of the application within the one or more stack traces.

13. The user device of claim 8, the operations further comprising:
sending, by the user device, information to a remote location via a network connection, wherein the information includes an indication that the cause of the crash is associated with an application feature.

14. The user device of claim 13, wherein the information is a crash report.

15. A non-transitory computer-readable medium containing computer program code that, when executed by operation of one or more computer processors, performs operations comprising:
collecting a first set of data corresponding to a run time environment of an application executing on a user device;
collecting a second set of data corresponding to a crash of the application;
identifying an executable portion of the application, comprising at least one of:
(i) identifying a cause of the crash based on the first set of data and the second set of data, and identifying the executable portion of the application based on the cause of the crash; or
(ii) determining that the cause of the crash is indeterminate, and identifying the executable portion of the application based on the first set of data; and
altering execution of the identified executable portion of the application.

16. The non-transitory computer-readable medium of claim 15, wherein altering execution of the identified executable portion of the application comprises:
disabling an application feature using a corresponding feature flag, based on determining the cause of the crash is associated with the application feature.

17. The non-transitory computer-readable medium of claim 15, the operations further comprising:
determining the cause of the crash is associated with an application feature corresponding to a feature flag,
wherein the application feature corresponds to the executable portion of the application, and
wherein the first set of data includes a memory location of the executable portion of the application.

18. The non-transitory computer-readable medium of claim 17, wherein the second set of data includes one or more stack traces corresponding to the crash.

19. The non-transitory computer-readable medium of claim 18, wherein determining the cause of the crash is associated with the application feature is based on identifying the memory location of the executable portion of the application within the one or more stack traces.

20. The non-transitory computer-readable medium of claim 15, the operations further comprising:
sending, by the user device, information to a remote location via a network connection, wherein the information includes an indication that the cause of the crash is associated with an application feature.

* * * * *